United States Patent
Sadowski (10) Patent No.: US 7,287,170 B2
(45) Date of Patent: Oct. 23, 2007

(54) METHOD AND APPARATUS FOR POWER MANAGEMENT USING SYSTEM AND REQUEST TOKENS

(75) Inventor: Greg Sadowski, Cambridge, MA (US)

(73) Assignee: ATI Technologies Inc., Markham, Ontario (CA)

( * ) Notice: Subject to any disclaimer, the term of this patent is extended or adjusted under 35 U.S.C. 154(b) by 593 days.

(21) Appl. No.: 10/145,502

(22) Filed: May 14, 2002

(65) Prior Publication Data
US 2003/0217295 A1 Nov. 20, 2003

(51) Int. Cl.
*G06F 1/26* (2006.01)
(52) U.S. Cl. .................. 713/300; 713/340
(58) Field of Classification Search ........... 713/300; 345/212
See application file for complete search history.

(56) References Cited
U.S. PATENT DOCUMENTS

| | | | |
|---|---|---|---|
| 6,182,022 B1 * | 1/2001 | Mayle et al. ............. 702/182 |
| 6,411,126 B1 * | 6/2002 | Tinsley et al. ............ 326/83 |
| 6,559,838 B1 * | 5/2003 | Lonoce et al. ............ 345/212 |
| 6,781,973 B1 * | 8/2004 | Lee ........................ 370/332 |
| 2001/0034569 A1 * | 10/2001 | Yamamoto et al. ....... 700/295 |
| 2002/0056085 A1 * | 5/2002 | Fahraeus ................. 725/1 |

* cited by examiner

*Primary Examiner*—Rehana Perveen
*Assistant Examiner*—Tse Chen
(74) *Attorney, Agent, or Firm*—Vedder, Price, Kaufman & Kammholz, P.C.

(57) ABSTRACT

A power management control circuit and method thereof includes a power register that contains a number of request tokens for at least one power consumption module. The number of request tokens represents a power adjust level of the at least one power consumption module. The power management control circuit and method thereof further includes a power controller coupled to the power register, wherein the power controller determines whether to adjust the power consumption module based on a comparison of a number of system tokens with the number of request tokens for the power consumption module. The power management control circuit and the method thereof further includes a token generator coupled to the power controller. The token generator generates the predetermined number of system tokens and a token valid signal for clearing an up token register and a down token register for each predetermined time interval.

22 Claims, 4 Drawing Sheets

METHOD AND APPARATUS FOR POWER MANAGEMENT USING SYSTEM AND REQUEST TOKENS

FIELD OF THE INVENTION

The present invention relates generally to power management systems and more particularly to power management systems within a control circuit.

BACKGROUND OF THE INVENTION

As the complexity of processing systems increase, more processing components are incorporated and utilize the system power source. As the number of components using the system power increases, so does the volatility of adjusting the power control within the device. Typical processing systems enable and disable components based on their requirements of use within the system. For example, a system power controller may disable specific components, such as a graphics rendering engine, if they are not needed for specific processing periods, thus saving power. With the increase in the number of processing components, too large of an adjustment may cause distortions or other interference with the operation of the circuit.

The processing system contains a slew rate by which the power adjustment must not exceed. If the amount of power of the system is adjusted beyond the slew rate, this may cause distortion or other anomalies within the operating frequencies of the internal components. In a processing system, if too many components are enabled or disabled at any given time interval, this power adjustment may exceed the slew rate of the processing system and adversely affect system operations.

Therefore, there exists a need for power management of a processing control circuit to ensure the power adjustments do not exceed the maximum slew rate.

BRIEF DESCRIPTION OF THE DRAWINGS

The invention will be more readily understood with reference to the following drawings, wherein.

DETAILED DESCRIPTION OF THE PREFERRED EMBODIMENT

The disclosed invention is a method and apparatus for a power management control circuit that includes at least one power consumption module having a power adjust level. The method and apparatus further includes a power register containing at least one request token for each of the at least one power consumption modules, where the number of request tokens represents the power adjust level of each of the power consumption modules. A token represents a defined amount of adjustable power, i.e., increased or decreased by enabling or disabling one of the power consumption modules.

If one of the power consumption modules is enabled or disabled, the total system power is adjusted by the corresponding power adjust level, as represented by the number of tokens. The power management control circuit further includes a power controller operably coupled to the power register and the power consumption modules. The power controller determines whether adjusting the power consumption module in response to the power change request exceeds the control circuit slew rate. Thereupon, the power controller enables a power change request if the number of request tokens within the power register does not exceed a number of system tokens stored within a system token register.

A token generator is further operably coupled to the power controller, wherein the token generator generates the system tokens provided to the power controller. The token generator generates a predetermined number of up tokens and a predetermined number of down tokens based on the control circuit slew rate and provides the system tokens to the power controller at an independent interval defined by the token generator. The system token register includes two separate registers, one for storing up tokens and the other register for storing down tokens wherein the up tokens are provided to the up token register and the down tokens are provided to the down token register.

When the power controller receives and acknowledges a power change request from one of the power consumption modules, the power controller retrieves the number of request tokens from the power register corresponding to the power consumption module and compares the number of request tokens to the number of system tokens. Depending on the requested power adjustment of the power consumption module, the power controller compares the number of request tokens with either the number of up tokens or the number of down tokens. For example, if the power consumption module wishes to disable operation, and reduce power consumption by becoming idle, the comparator compares the number of request tokens with the number of down tokens, as the number of down tokens within the down register indicates the number of power levels that the control circuit may adjust power without exceeding the slew rate. If it is determined that the power consumption module may be adjusted, the power controller enables the idling of the power consumption module, and also updates the number of up tokens and down tokens within the up register and the down register.

In the example where the power consumption module is turned off, the number of down tokens is decreased by the number of request tokens and the number of up tokens is increased by the number of request tokens. Therefore, the power management system determines that the controller may withstand a larger increase in power by enabling further power consumption modules, upon request, without adversely affecting the slew rate. As recognized by one skilled in the art, adjusting the system clock frequency or adjusting the voltage power supply may further adjust the power of the processing circuit.

Figure 1:
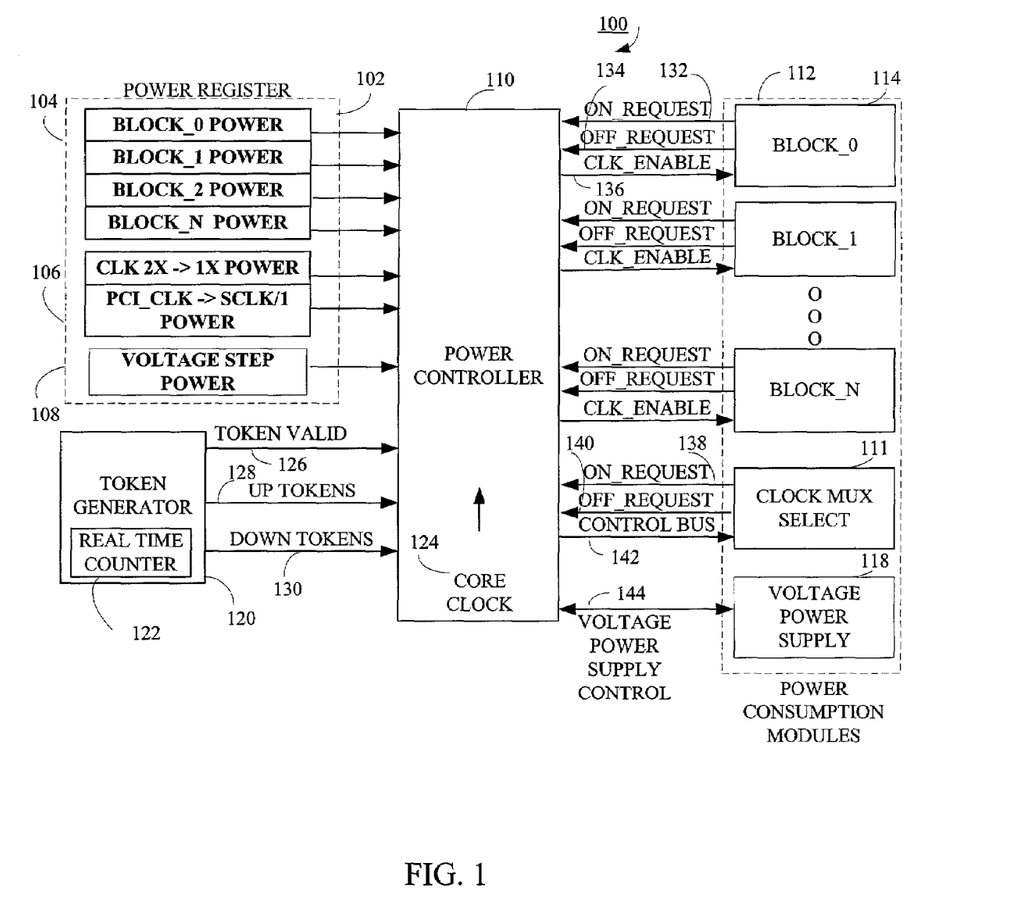
FIG. 1 is a block diagram illustrating a power management system in accordance with one embodiment of the present invention.

FIG. 1 illustrates a power management control circuit 100, such as a graphics processing system, in accordance with one embodiment of the present invention. The circuit 100 includes a power register 102 which includes a plurality of individual registers, such as a plurality of block registers 104, a clock power register 106 and a voltage step power register 108.

The circuit 100 further includes a power controller 110 coupled to the power register 102. The power controller 110 is further coupled to a plurality of power consumption modules 112, such as a plurality of functional blocks 114, a clock multiplexer select 111 and a voltage power supply 118. The functional blocks 114 represent processors such as a graphics rendering engine, a display engine, an input/output device interface, or any other suitable functional block as recognized by one skilled in the art. The control circuit 100 has three typical ways to adjust power consumption, such as adjusting the clocks to the functional blocks 114, adjusting the frequency of the main clock through the clock multiplexer select 111, or adjusting the supply voltage through the voltage power supply 118.

Further included within the circuit 100 is a token generator 120 having a real time counter 122, such as a clock which runs independent of a core clock 124 within the power controller 110. The token generator 120 is coupled to the power controller 110 and provides therein at least three signals, a token valid signal 126, a plurality of up tokens 128 and a plurality of down tokens 130. The token generator provides these three signals, 126, 128 and 130, to the power controller 110 at a predefined time interval as determined by the real time counter 122, independent of the core clock 124.

Further illustrated in FIG. 1, the power consumption modules 112, specifically the functional blocks 114, clock multiplexer select 111, and the voltage power supply 118, interact with the power controller 110 through a plurality of connections. Using block_0 114 as an example, the block 114 provides the power controller 110 an ON_REQUEST 132, an OFF_REQUEST 134 and receives a clock enable (CLK_ENABLE) signal 136. Also, the clock multiplexer (mux) select 111 provides an ON_REQUEST 138, an OFF_REQUEST 140 and receives a control bus command 142. The voltage power supply 118 interacts with the power controller 110 through a voltage power supply control command 144.

Each of the power consumption modules 112 has a power adjust level, typically indicated in terms of milliwatts, or any other suitable unit of measurement as recognized by one having ordinary skill in the art. Each power adjust level for each of the power consumption modules 112 is translated into representative request tokens, where a token is a base amount of power adjustment and the number of request tokens represents the amount of power change that occurs when one of the power consumption modules is adjusted. For example, block_1 may contain a power adjust level represented by five tokens. The power register 102 store the number of request tokens corresponding to the power consumption modules 112. Therefore, using the previous example, the power register block_1 power register, part of the plurality of block registers 104, contains five tokens. The circuit 100 maintains the same token power level designation provided with the token generator 120 such that the up tokens 128 and down tokens 130 each represent the same base token power level.

Figure 2:
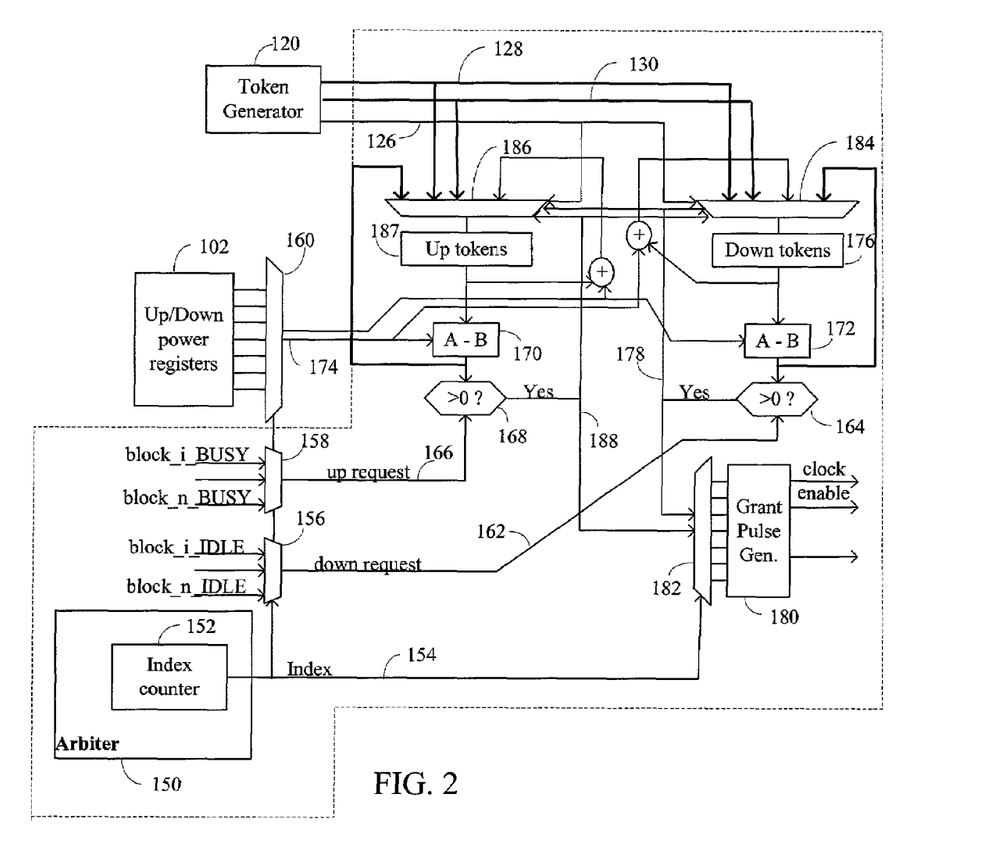
FIG. 2 is a block diagram further illustrating the power management system of FIG. 1, in accordance with one embodiment of the present invention.

FIG. 2 further illustrates the circuit 100 of FIG. 1 with the token generator 120 coupled to the power controller 110, wherein the power controller is coupled to the power register 102. The power controller 110 includes an arbiter 150 which contains an index counter 152, wherein the index counter 152 aids in determining if a power change request has been provided by at least one of the power consumption modules. The index counter 152 generates an index 154 that is provided to a plurality of multiplexers 156, 158 and 160 that check to see if a power change request exists. Using the reference numerals i through n for the power consumption modules 112, assuming the index counter 152 begins with i, at the first multiplexer 156 it is determined whether an idle signal is enabled, one of the blocks thereby requesting to be powered down. If an IDLE request signal is detected, the multiplexer 156 sends a down request 162 to a comparator 164 within the power controller 110. If a BUSY request is detected, the multiplexer 158 provides an up request 166 to the comparator 168 within the power controller 110. If either an up request 166 or a down request 162 is provided, the multiplexer 160 thereupon provides the corresponding number of request tokens from the power register 102 associated with blocks 170 and 172, via communication path 174.

First using the example of a down request 162, the comparator 164 initially makes a determination whether the number of request tokens exceeds the number of down tokens within the down token register 176. If it is determined that enabling the down request will not violate the power slew rate, a YES signal 178 is provided to a grant pulse generator 180 via the multiplexer 182. The multiplexer 182 also receives the index 154 and provides the index and YES signal to the grant pulse generator 180, whereupon a clock disable signal is provided to the power consumption module, not specifically illustrated in FIG. 2. Furthermore, once the YES signal 178 is generated, the number of request tokens is further provided to a down token multiplexer 184 and an up token multiplexer 186. Thereupon, the number of down tokens is reduced by the number of request tokens and the number of up tokens is increased by the number of request tokens.

Using the example of an up request 166, a determination is made as to whether the enablement of the power up request will exceed the circuit slew rate. If it is determined that the system may grant the up request because the corresponding number of up tokens within the token register 187 is greater than or equal to the number of request tokens, a YES signal 188 is generated and provided to the grant pulse generator 180 via the multiplexer 182. Also, the YES signal is provided to the up token multiplexer 186 and the down token multiplexer 184, whereupon the number of up tokens within may be reduced by an amount equal to the request tokens and the number of down tokens may be increased by an amount equal to the number of request tokens.

The power management system within the circuit 110 continues operation using the index counter 152 to inquire as to any IDLE or BUSY requests of the power consumption modules 112 pursuant to an internal core clock 124, as illustrated in FIG. 1. The power management system utilizes the up tokens and down tokens, internally updating the token amounts for a defined time interval. At the beginning of every time interval defined by the token generator 120, the token generator 120 provides the token valid signal 126 and the up token signal 128 and down token signal 130 to the multiplexers 186 and 184 thus overwriting the number of up tokens and down tokens within the token registers 187 and 176. Thereupon, at the beginning of every predefined time interval, the power management system 110 is given a defined amount of up tokens and down tokens corresponding to the maximum slew rate of power adjustment for the system. During the time interval, the power management system within the power controller 110 manages itself through updating the up token register 187 and the down token register 176 based on power adjustments, so as to not exceed the slew rate for the given time interval.

Figure 3:
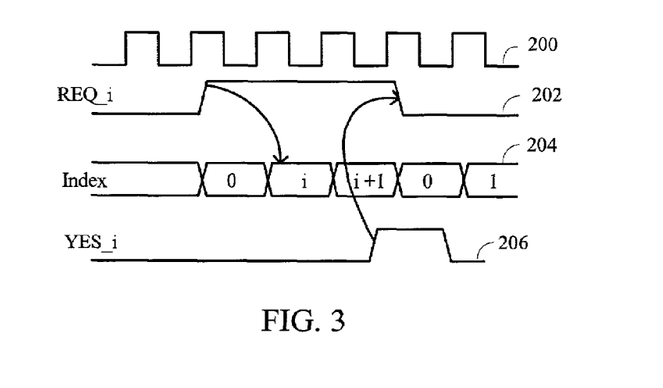
FIG. 3 is a timing diagram representing a best-case scenario for a power adjustment request within the power management system of FIG. 1, in accordance with one embodiment of the present invention.

FIG. 3 illustrates a best-case scenario of a timing diagram of the operations of the index counter 152 recognizing a request from a power consumption module 112 and the response by either the multiplexer 156 or multiplexer 158. The timing diagram illustrates four signals, the first signal 200 is a clock signal generated by the core clock 124 of the power controller. The second signal 202 is a request signal from a requesting power consumption module, as indicated as $REQ_{-i}$ from $block_{-i}$ such as illustrated in FIG. 2. The third signal 204 represents the counter of the index, such as index 154, representing the incremental adjustment of the index counter 152.

Timing line 206 further represents a YES signal as indicated by either up request 166 or down request 162 depending on whether the $REQ_{-i}$ 202 indicates a BUSY or an IDLE signal. As illustrated, a request signal must match the index signal from the index counter 152. When the index 204 matches the request signal 202, a YES signal is enabled 206. FIG. 3 illustrates the best-case scenario because at the time interval that the request 202 was transmitted, the index 204 was on the appropriate index counter and the YES signal 206 was automatically initiated.

In one embodiment of the present invention, a round robin technique may be utilized with the index counter, where the index counter simply increments through the power consumption modules. The index counter, for each power consumption module, inquires as to whether an IDLE signal or a BUSY signal is transmitted. In the worst case scenario, the time interval for enabling a request may coincide with the number of power consumption modules recognized by the index counter. As recognized by one of average skill in the art, any other suitable means for determining control block requests may be utilized with controller 110 and the timing diagram of FIG. 3 is for illustrative purposes only and so herein limiting.

In one embodiment of the present invention, the arbiter 150 of FIG. 2 and the index counter 152 may utilize a prioritization technique to determine which of the control blocks to check for a power change request. Furthermore, the system of FIG. 2 may further provide the ability to determine when an enable request and a disable request have offsetting token values, wherein one request may not be granted because of the limited number of system tokens but allowing both requests does not violate the system slew rate by creating a negative number of either up tokens or down tokens.

Figure 4:
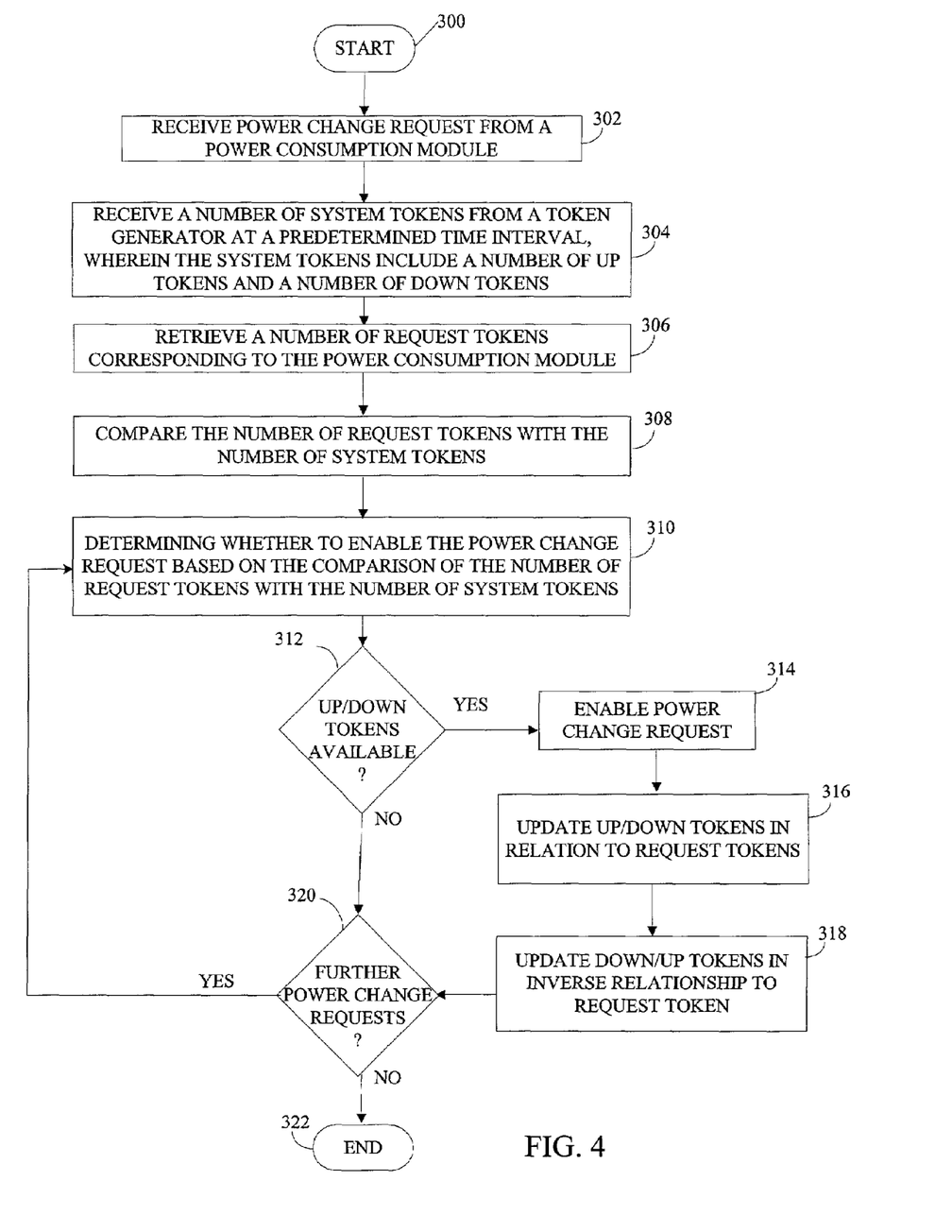
FIG. 4 is a flow chart illustrating the operation of the power management system in accordance with one embodiment of the present invention.

FIG. 4 illustrates a flow chart representing the steps of one embodiment of the present invention. The process begins 300 by receiving a power change request from a power consumption module, designated at step 302. As recognized by one having ordinary skill in the art, the power change request for the power consumption module in step 302 may be received at any time as the determining factor is when the controller recognizes the power change request. In the next step, 304, a number of system tokens are received from the token generator at the time interval defined by the token generator. The system tokens include a predetermined number of up tokens and a predetermined number of down tokens.

In the next step, 306, a number of request tokens corresponding to the power consumption module are retrieved from the power register. As discussed above with reference to FIG. 1, the individual power consumption module that requests a power change has a predetermined number of request tokens which coordinates with the power adjust level of the power consumption module. A number of request tokens that correspond with the power change request is compared with the number of system tokens, designated at step 308. A determination is made whether to enable the power change request based on the comparison of the number of request tokens with the number of system tokens, step 310.

As the system tokens include a predetermined number of up tokens and a predetermined number of down tokens, the request tokens are compared with either the up tokens or the down tokens, based on the type of power change request. For example, if the power consumption module is to be disabled, that creates a decrease in power consumption of the total system, and the corresponding number of request tokens would be compared with the existing number of down tokens. At determination step 312, if the proper number of system tokens, either up tokens or down tokens, are available, the power change request is enabled, step 314. Thereupon, the number of up or down tokens in relation to the request token is appropriately adjusted, step 316. For example, if the power change request were a decrease of five request tokens, the number of down tokens would thereupon be decreased by five. The system further thereupon compensates for the adjustment of the up or down token relation to the power change request by updating the non-corresponding token register, step 318. In the example described above, in step 316 where the number of down tokens is decreased by five tokens, the number of up tokens is thereupon increased by the corresponding number of request tokens. As discussed above with reference to FIG. 2, the controller is concerned with the total slew rate of the system and by decreasing power consumption even further increases in power consumption without violating the slew rate is provided.

In the next step 320, it is determined whether there are more power change requests. Also with reference above to step 312, if it is determined that the number of up or down tokens are not available, for example, the request tokens is greater than the number of up tokens or down tokens, the power change request is not enabled and it is once again determined whether further power change requests exist 320. As recognized by one having ordinary skill in the art, simply because a power change request is not enabled, that does not prohibit further power change requests and also does not prohibit the denied request from being further enabled should more up or down tokens become available at a later time within the predefined time interval. If further power change requests are found, the method returns to step 310 where it is determined whether to enable the power change request based on a comparison of the number of request tokens to the number of system tokens.

If it is determined that no further power change request exists, the method is complete, step 322. The above method is within a predefined interval as defined by the token generator. The number of up tokens and down tokens are reset by the token valid signal 126 of FIG. 1 and the new predetermined number of system tokens are written to the up register and the down register.

Figure 5:
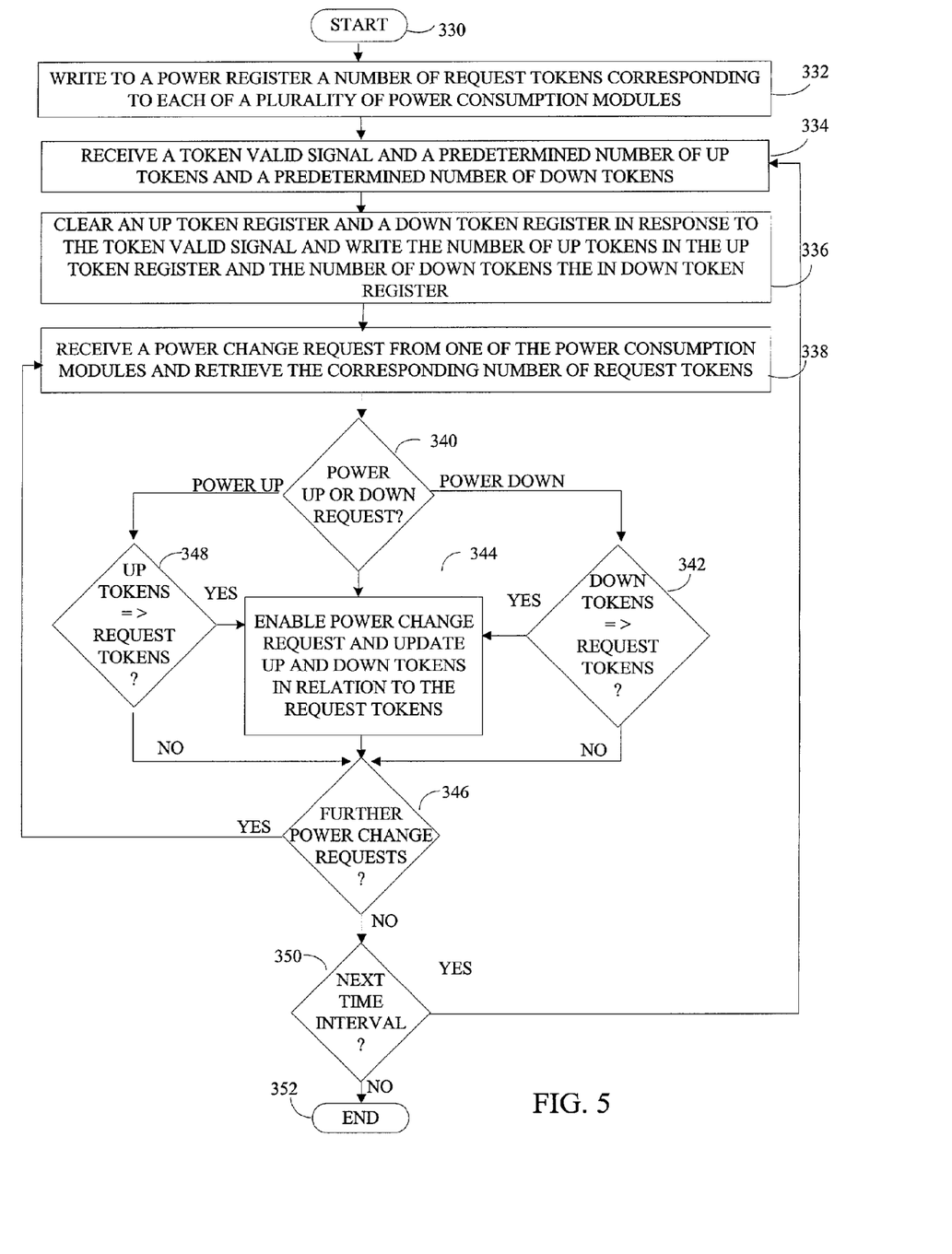
FIG. 5 is a flow chart illustrating the operations of the power management system in accordance with one embodiment of the present invention.

FIG. 5 illustrates another embodiment of the method for power management. The method begins, 330, by writing to a power register a predetermined number of request tokens that correspond to each of a plurality of power consumption modules, step 332. In one embodiment, prior to system start up, the power registers are provided with the appropriate number of request tokens that correspond to the power adjust levels of each specific power consumption module. The system thereupon receives a token valid signal and a predetermined number of up tokens and a predetermined number of down tokens, designated at step 334. As discussed above, the token valid signal clears the existing number of up tokens and down tokens within the token registers and allows for the writing of the predetermined number of up tokens and predetermined number of down tokens at the start the predefined time interval, designated at step 336.

In the next step, 338, the system receives a power change request from one of the power consumption modules and thereupon retrieves the corresponding number of request tokens within the power register. A determination is initially made as to whether the request is a power up or a power down request, such as a CLOCK_ENABLE or CLOCK-DISABLE request, designated at decision block 340. Wherein the power request is a power down request, step 342, a comparison is made as to whether the number of down tokens is greater than or equal to the number of request tokens provided from the power register. If the number of down tokens is greater or equal to the number of request tokens, the controller enables the power change request and updates the up and down token registers with the number of up and down tokens in relation to the request token power adjustment, step 344. The number of up tokens and down tokens is adjusted in accordance with the above discussion wherein in a power-down request, the number of down tokens is decreased by the number of up tokens is increased by the number of request tokens.

Whereupon, step 346, a determination is made whether there are further power change requests within the system. If more power change requests are determined, step 338, the corresponding number of request tokens is retrieved from the power register. The system thereupon once again determines whether the power request is a power up request or a power down request, 340.

In the event the power request is a power up request, step 348, a determination is made as to whether the number of up tokens is greater than or equal to the number of request tokens. If it is determined that the power change request does not violate the system slew rate, the number of up tokens is greater or equal to the number of request tokens, once again the power change request is enabled and the number of up and down tokens in relation to the number of request tokens is updated, step 344. In the event that the number of up tokens is not greater than or equal to the number of request tokens, another determination is made as to whether further power change requests exist 346. In other words, the power change request is not enabled and the system then looks for further power change requests.

With reference to decision block 342, in the event the number of down tokens is not greater than or equal to the number of request tokens, a determination is once again made as to whether there are any further power change requests, decision block 346.

In the event no further power change requests are found, the system then determines whether or not the next time interval occurs, step 350. In one embodiment of the present invention, the time interval is decided by the token register and the decision step 334 is activated by the token valid signal. If there are no further time intervals that exist, step 350, the method is complete 352.

The present invention provides the method and apparatus for power management using system and request tokens. A power change request, such as a clock_enable or clock_disable request, is received and the corresponding number of request tokens stored in the power register are retrieved, wherein the number of request tokens represents the power consumption module power adjust level. Based on the power change request from the power consumption module, a determination is made whether the controller may enable the power change request without violating the system slew rate. The controller compares the number of request tokens with the number of system tokens, correspondingly comparing a number of up tokens if it is an enable request and a number of down tokens if it is a disable request. In the event that the number of request tokens is not greater than the corresponding number of system tokens, the controller thereupon enables the power change request and updates the system tokens accordingly.

It should be understood that the limitations of other variations and modifications of the invention in its various aspects as may be readily apparent to those of ordinary skill in the art, and that the invention is not limited by the specific embodiments described herein. For example, the power register of FIG. 1 may be disposed within the power consumption module as opposed to being a separate register file. It is therefore contemplated to cover by the present invention any and all modifications, variations or equivalents that fall within the spirit and scope of the basic underlying principles disclosed and claimed herein.

What is claimed is:

1. A power management control circuit comprising:
   a power register containing a number of request tokens for at least one power consumption module, wherein the number of request tokens represents a power adjust level of the at least one power consumption module; and
   a power controller operably coupled to the power register, wherein the power controller determines whether to adjust the power consumption module based on a comparison of a number of system tokens with the number of request tokens for the power consumption module, wherein the number of system token is based on a power slew rate of the power management control circuit.

2. The power management control circuit of claim 1 further comprising:
   a token generator operably coupled to the power controller, wherein the token generator generates the number of system tokens and provides the system tokens to the power controller.

3. The power management control circuit of claim 2 wherein the token generator periodically generates and provides the number of system tokens to the power controller at a predetermined time interval.

4. The power management control circuit of claim 2 wherein the power controller further comprises:
   a system token register which stores the system tokens; and
   a comparator operably coupled to the power register and the system token register, wherein the comparator compares the number of request tokens with the number of system tokens and instructs the power controller whether to adjust the power of the power consumption module.

5. The power management control circuit of claim 4 wherein the system tokens include a plurality of up tokens and a plurality of down tokens and the system token register further comprises:
   an up token register which stores the plurality of up tokens generated by the token generator;
   a down token register which stores the plurality of down tokens generated by the token generator.

6. The power management control circuit of claim 5 wherein when the at least one power consumption module requests an increase in power and the comparator instructs the power controller to adjust the power, the plurality of up tokens is decreased by the corresponding request token value and when the at least one power consumption module requests a decrease in power and the comparator instructs the power controller to adjust power, the plurality of down tokens is decreased by the corresponding request token value.

7. The power management control circuit of claim 5 wherein when the at least one power consumption module requests an increase in power and the comparator instructs the power controller to adjust the power, the plurality of down tokens is increased by the corresponding request token value and when the at least one power consumption module requests a decrease in power and the comparator instructs the power controller to adjust power, the plurality of up tokens is increased by the corresponding request token value.

8. The power management control circuit of claim 1 wherein each of the system tokens and the request tokens represent a predetermined unit of power adjustment.

9. The power management control circuit of claim 1 wherein the at least one power consumption module includes at least one of a processing block, a clock selector, and a voltage power supply and wherein the power management control circuit is a graphics processing circuit.

10. A power management control circuit comprising:
  at least one power consumption module having a power adjust level;
  a power register containing at least one request token for each of the at least one power consumption modules, wherein the number of request tokens for each of the at least one power consumption modules correspond to the power adjust level of each to the at least one power consumption module;
  a power controller operably coupled to the power register and the at least one power consumption module, wherein the power controller determines whether to adjust each of the at least one power consumption modules based on a comparison of a number of system tokens with the number of request tokens for each of the at least one power consumption module; and
  a token generator operably coupled to the power controller, wherein the token generator generates the number of system tokens based on a power slew rate of the power management control circuit and provides the system tokens to the power controller.

11. The power management control circuit of claim 10 wherein the power controller further comprises:
  a system token register which stores the system tokens; and
  a comparator operably coupled to the power register and the system token register, wherein the comparator compares the number of request tokens with the number of system tokens and instructs the power controller whether to adjust the power of the at least one power consumption module.

12. The power management control circuit of claim 11 wherein the system tokens comprise a plurality of up tokens and a plurality of down tokens and the system token register further comprises:
  an up token register which stores the plurality of up tokens generated by the token generator; and
  a down token register which stores the plurality of down tokens generated by the token generator.

13. The power management control circuit of claim 12 wherein when the at least one power consumption module requests an increase in power and the comparator instructs the power controller to adjust the power, the plurality of up tokens is decreased by the corresponding request token value and when the at least one power consumption module requests a decrease in power and the comparator instructs the power controller to adjust power, the plurality of down tokens is decreased by the corresponding request token value.

14. The power management control circuit of claim 12 wherein when the at least one power consumption module requests an increase in power and the comparator instructs the power controller to adjust the power, the plurality of down tokens is increased by the corresponding request token value and when the power consumption module requests a decrease in power and the comparator instructs the power controller to adjust power, the plurality of up tokens is increased by the corresponding request token value.

15. The power management control circuit of claim 10 wherein each the system tokens and each of the request tokens represent a predetermined unit of power adjustment.

16. The power management control circuit of claim 15 wherein the token generator periodically generates and provides the numerical amount of system tokens to the power controller at a predetermined time interval and wherein the control circuit is a graphics processing circuit.

17. A power management graphics processing circuit comprising:
  at least one power consumption module having a power adjust value;
  a power register containing at least one request token for each of the at least one power consumption modules, wherein the number of request tokens for each of the at least one power consumption modules correspond to the power adjust value of each to the at least one power consumption modules;
  a power controller operably coupled to the power register and the at least one power consumption module, wherein the power controller determines whether to adjust each of the power consumption modules based on a comparison of a number of system tokens with the number of request tokens for each of the at least one power consumption modules;
  a token generator operably coupled to the power controller, wherein the token generator generates the number of system tokens and provides the system tokens to the power controller;
  a system token register coupled to the power controller comprising an up token register and a down token register wherein the number of system tokens includes a number of tokens stored within the up token register and a number of down tokens stored within the down token register.

18. The power management graphics processing circuit of claim 17 wherein when the at least one power consumption module requests an increase in power and the comparator instructs the power controller to adjust the power, the plurality of up tokens is decreased by the corresponding request token value and when the at least one power consumption module requests a decrease in power and the comparator instructs the power controller to adjust power, the plurality of down tokens is decreased by the corresponding request token value.

19. The power management graphics processing circuit of claim 17 wherein when the at least one power consumption module requests an increase in power and the comparator instructs the power controller to adjust the power, the plurality of down tokens is increased by the corresponding request token value and when the at least one power consumption module requests a decrease in power and the comparator instructs the power controller to adjust power, the plurality of up tokens is increased by the corresponding request token value.

20. The power management graphics processing circuit of claim 17 wherein each of the system tokens and each of the request tokens represent a predetermined unit of power adjustment.

21. The power management graphics processing circuit of claim 17 wherein the token generator periodically generates and provides the number of system tokens to the power controller at a predetermined time interval.

22. An apparatus comprising:
a plurality of power consumption modules each having at least one power change request token associated therewith; and
a power controller operable to determine whether to adjust power for one or more of the plurality of power consumption modules based on a comparison of the at least one power change request tokens and a number of system tokens, wherein the number of system tokens is based on a power slew rate of the power management control circuit, so that the power slew rate is not exceeded.

* * * * *